Aug. 9, 1932.  G. D. SMITH  1,870,928
HORIZONTALLY ROTATABLE WINGED ROTOR FOR AIRCRAFT
Filed Dec. 30, 1931  2 Sheets-Sheet 1
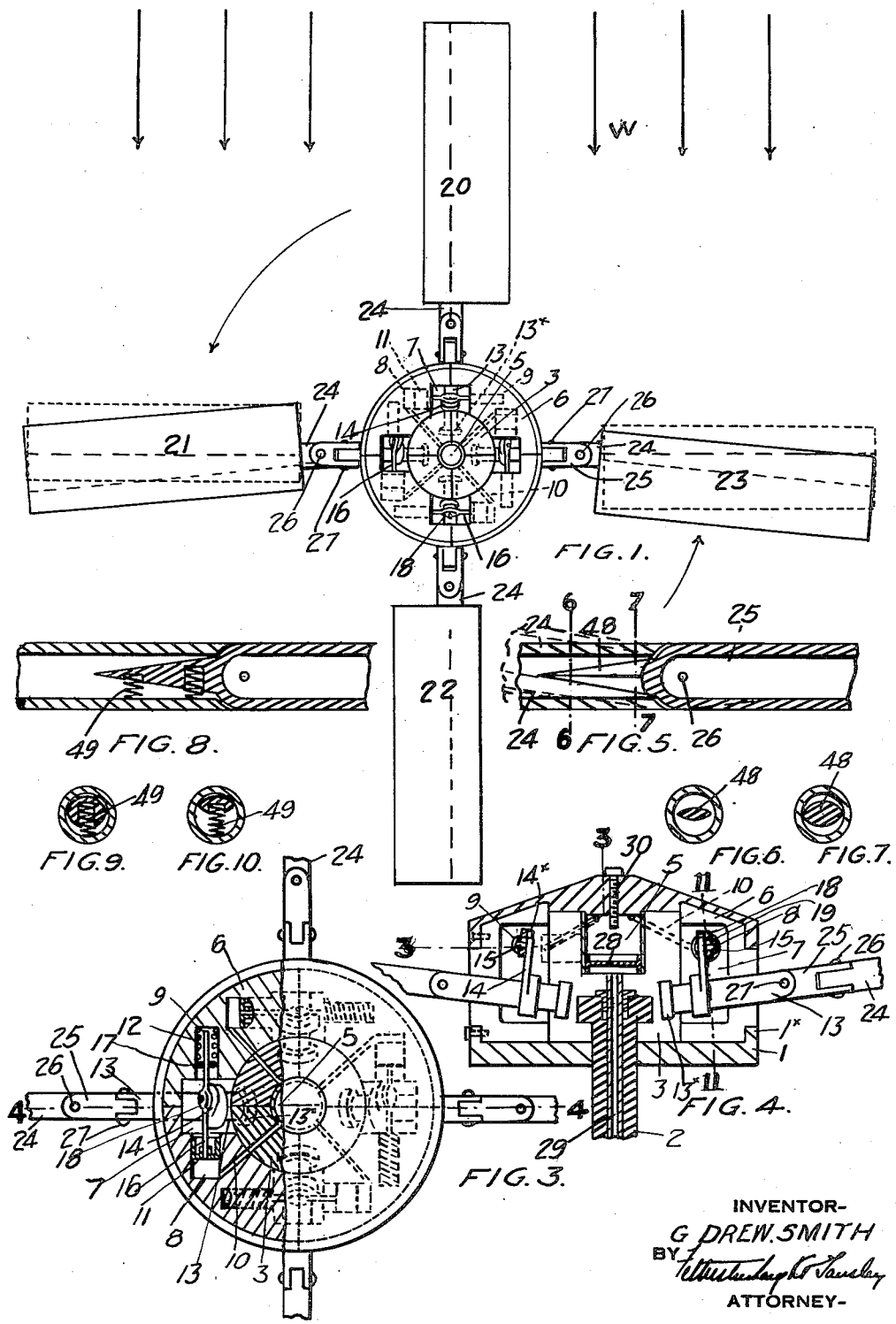
INVENTOR-
G DREW SMITH
BY
ATTORNEY- Aug. 9, 1932.　　　　G. D. SMITH　　　　1,870,928
HORIZONTALLY ROTATABLE WINGED ROTOR FOR AIRCRAFT
Filed Dec. 30, 1931　　2 Sheets-Sheet 2
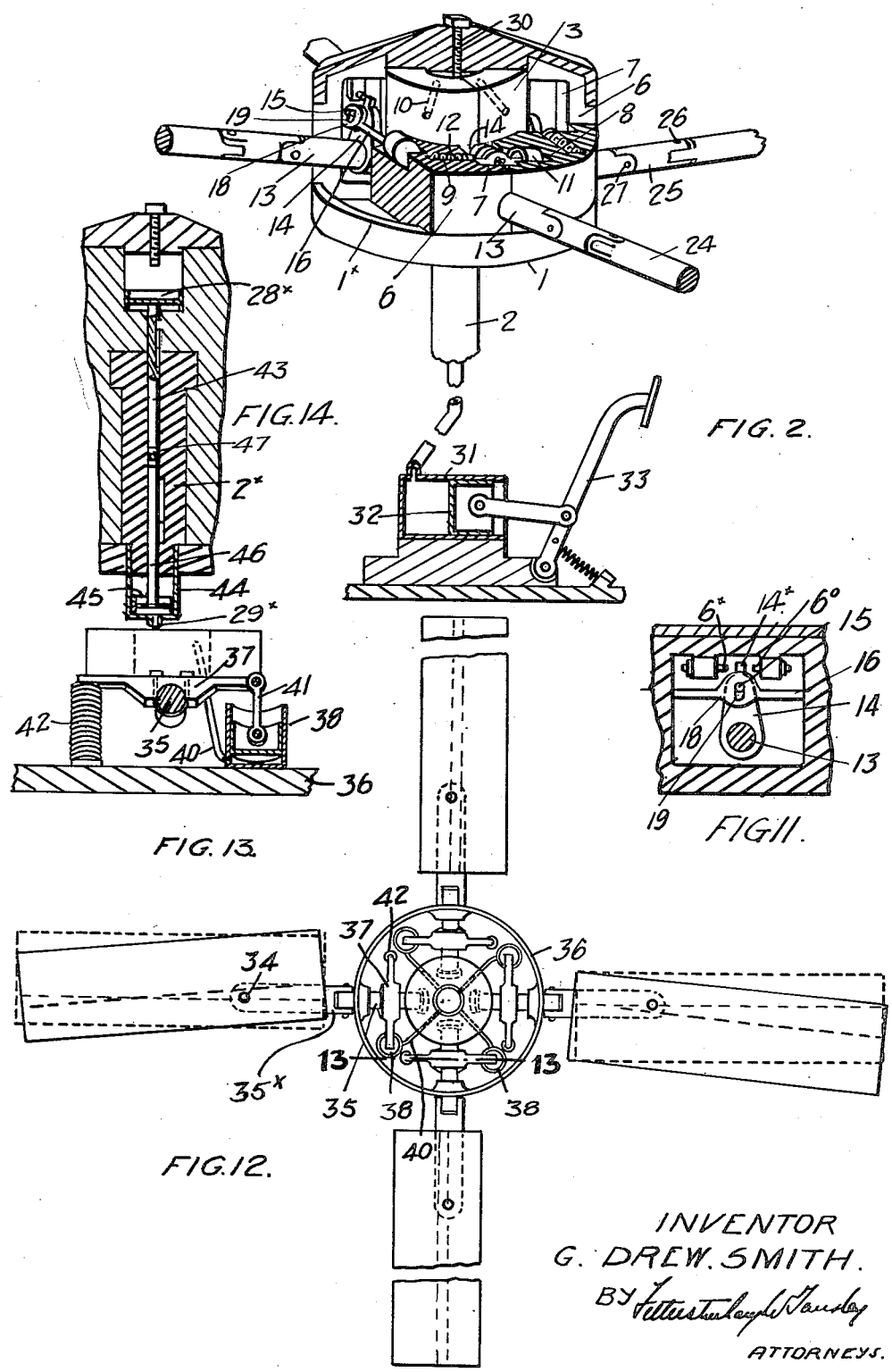

Patented Aug. 9, 1932

1,870,928

UNITED STATES PATENT OFFICE

GERALD DREW SMITH, OF TORONTO, ONTARIO, CANADA

HORIZONTALLY ROTATABLE WINGED ROTOR FOR AIRCRAFT

Application filed December 30, 1931. Serial No. 583,962.

My invention relates to improvements in horizontally rotatable winged rotors for aircraft having a plurality of wings, and the object of the invention is to devise, in a winged rotor, means for automatically adjusting the wings to an angle of incidence, as each wing passes through the different phases and conditions encountered in their flight about the common hub or axis thereby balancing the rotor and equalizing the lift producing a maximum lifting effort, and further to provide means whereby the angle of incidence of all the wings or the average angle of incidence may be simultaneously varied at the will of the operator, but at all times retaining the above characteristics, and it consists essentially of the arrangement and construction of parts as hereinafter more particularly explained.

Fig. 1 is a plan view of a rotor in which the line of longitudinal lift of each wing coincides with the normal position of the line of centrifugal force.

Fig. 2 is a perspective detail of the rotor hub partially broken away and in section showing the automatic wing control mechanism and the wing control mechanism actuated by the operator connected thereto.

Fig. 3 is an enlarged view of the hub partially in plan and partially in section, the section being taken on line 3—3 Fig. 4.

Fig. 4 is a vertical section on line 4—4 Fig. 3.

Fig. 5 is an enlarged sectional view through one of the wing joints.

Figs. 6 and 7 are cross sectional views on 6—6 and 7—7 Fig. 5.

Figs. 8, 9 and 10 are views corresponding to views 5, 6 and 7 showing a spring resisted joint.

Fig. 11 is a sectional view on line 11—11 Fig. 4.

Fig. 12 is a plan view of a modification of the structure shown in Fig. 1.

Fig. 13 is an enlarged sectional view on line 13—13 Fig. 12.

Fig. 14 shows a modification of a coupling between the main device and the device actuated by the pilot.

In the drawings like characters of reference indicate corresponding parts in each figure.

Referring to Figs. 1 to 11 inclusive.

1 is a hub supporting plate mounted upon a stud or standard 2 suitably carried on the aircraft. The plate 1 is provided with a surrounding flange $1^x$. The centre body of the hub comprises four quadrantal members 3 which, when assembled, form a central cylindrical recess provided with a lining forming a distributing chamber 5.

Surrounding the centre body 3 are annularly arranged quadrantal portions 6 which, when assembled, form recesses 7 from opposite sides of which extend the bores 8 and 9. 10 are downwardly inclined ducts extending from the upper portion of the distributing chamber 5 to the inner end of each bore 8. 11 is a piston operable within each bore 8. 12 is a compression spring held in each bore 9.

13 are rocking shafts journalled in orifices formed between the portions 6 and members 3 of the hub and extending through the recesses 7 and provided, at their inner ends, with thrust bearings $13^x$.

14 is an arm secured to each shaft within the recess 7 and provided with a laterally extending pin 15.

16 is a piston rod connected at one end to the piston 11 and extending at its opposite end longitudinally of the spring 9 and provided with an adjustable enlargement 17 bearing against the end of the spring to vary its opposition to the movement of the piston 11. The rod 16 is provided intermediately of its length with an enlargement 18 provided with a transverse slot 19 through which the pin 15 extends, the pin being a sliding fit against each side of the slot.

20, 21, 22 and 23 are the wings in which the lift line coincides with the line of centrifugal force of the rotor each provided with a root shaft portion 24. 25 is a connecting link connected respectively by vertical and horizontal hinge pins 26 and 27 forming a universal joint connection between the rocking shaft 13 and the root shaft portion 24 of the wing. 28 is a free piston operating in the distributing chamber 5 dividing it into two compartments from the upper of which the ducts 10 lead and into the lower of which the pipe 29 leads. 30 is a set screw limiting the upward movement of the piston 28.

If the device is to be used only to equalize and balance the lift of the wing of the rotor the bottom of this cylinder is sealed and the free piston and coacting port may be eliminated.

The fluid supplied through the pipe 29 bears against the lower face of the movable piston 28. The chamber formed above the piston, the ducts 10 and the space in the cylinders 8 behind each piston 11 is fluid filled, the pipe 29 being provided with a gland 29× to prevent leakage. Each arm 14 is provided with a projection 14×. 6× and 6° are limiting stops carried by the hub structure and between which the projection 14× extends to alternately engage therewith as the shaft 13 is rocked. The stops 6× and 6° are adjustable.

The winged rotor above described may be positively driven as in a helicopter or it may be auto rotative or initially rotated before the take off, the drive being maintained by the air currents produced on the under side of the wings as the aircraft is carried through the air by the propeller or by its weight in descent.

As each wing is carried forward by its rotation from the wing position 22 towards the wing position 23 it enters the wind produced by the forward movement of the machine through the air and indicated by the arrows W its normal air speed is increased by the speed of this wind, with a corresponding increase in both its lifting power, and the drag or resistance to forward movement. This increase in the drag tends to force the wing back of its normal position as is shown in Figs. 1 and 12 wing 23 which in turn moves the centre of lift of the wing also back of the normal position which increases the leverage of the lifting force of the wing on its rocker shaft 13, through the shaft 24, and link 25, thereby also swinging the corresponding arm 14 forward together with the piston 11 forcing some of the liquid from that cylinder through its duct 10 into the distributing chamber 5 and hence through the remaining ducts 10 to the corresponding cylinders 8 of the other wings of the system. As the wing 23 turns on its rock shaft 13 its angle of incidence is decreased which correspondingly decreases both the lift and the drag, and tends to keep this wing at its normal lift as it passes through the air at increased speed or from position 22 through position 23 to position 20.

As each wing passes from position 20 through position 21 it passes through an area of reduced air speed by reason of the following wind produced by the forward movement of the machine through the air as indicated by the arrows W the above action is reversed the wing being thrown a little ahead of its normal position by its momentum by reason of its decreased drag due to its decreased air speed, this tends to turn the rocker shaft of this wing in the reverse direction to that of the wing entering the head wind which in turn draws its corresponding piston 11 out of its cylinder 8 drawing liquid through the duct 10 from the distributing chamber.

As this wing 21 turns on its rocker shaft 13 in the opposite direction to that of wing 23 it tends to increase its angle of incidence and hence increase its lifting power tending to keep the normal lift regardless of the air speeds.

The liquid forced from the cylinder 8 of the wing in position 23 into the distributing chamber hence passes to the cylinder 8 of the wing in position 21 since both of the wings in positions 20 and 22 are not affected by the wind produced by the forward movement of the machine and are, therefore, flying at normal lift and speed. If, however, the increased lift of the wing in position 23, requires a greater or less movement of its corresponding rocker shaft 13 to return its lift to normal, or a corresponding greater or less movement of liquid from its cylinder to the distributing chamber, than that required to return the wing in position 21 to its normal lift, a movement of the wings in positions 20 and 22 takes place such that each wing of the system carries as near the normal lifting power as possible with regard to the type of wings used and the forward movement of the machine through the air.

This system is adaptable to all winged rotors having two or more wings. A four wing system was chosen for the drawings because it showed to advantage the different air speeds that the wings pass through in relation to the forward movement of the machine through the air. The wings 20 and 22 being at their normal air speed as they are not affected by the flight of the machine through the air, the wing 21 being at the position of minimum air speed by reason of the following wind produced by the forward movement of the machine and wing 23 at the maximum air speed by reason of the head wind from the same source.

When the device is used with wings in which the drag is not materially increased by the increased air speed, the shaft 24 is so fastened to the wing and the weight of the wing so distributed that the longitudinal lift line will be a little back of the line of centrifugal force so that a slight pressure is applied normally to the liquid in the cylinders 8 ducts 10 of each wing unit by the lift of the wing, and the distributing chamber in this case the increasing of the lift of the wing passing through position 23 tends to rock the shaft 13 of that wing reducing its angle of incidence and hence its lift and by applying more pressure to the liquid in its cylinder forcing some of this liquid into the rest of the system and hence to wing 21 or where required. With this assembly the link 25 may be eliminated entirely, the shaft 24 being connected directly to the rocker shaft 13, or may be retained as a kind of shock absorber.

In order that the angle of incidence of all the wings may be simultaneously increased or decreased at the will of the operator I provide the following mechanism:

31 is a cylinder to the rear end of which the pipe 29 is connected. 32 is a piston operatively connected to a spring held pedal or hand lever 33.

By depressing or relieving the pressure on the lever 33 the volume of liquid in the cylinder 8 and pressure transmitted to all the pistons 11 are simultaneously varied to simultaneously increase or decrease their angle of incidence, the pipe 29 and cylinder 31 being fluid filled.

Figs. 12 and 13 illustrate a modification in which the lift line of each wing is to the rear of the centrifugal line extending longitudinally of the wing.

35 is a rock shaft mounted in the hub 36 in a similar manner to the shaft 13 of Fig. 1 and on which is pivotally mounted an arm 35×, a wing being pivoted to each arm 35× at 34 so that the lift line of the wing is to the rear of the line of centrifugal force. 37 is an arm mounted on the shaft 35. 38 is a cylinder the head of which is secured to the base of the hub 36 and is connected at its lower end to the distributing chamber 39 by a pipe 40. 41 is a link rod connecting the piston to the adjacent end of the arm 37, the opposite end of the arm bearing upon a compression spring 42.

In order to overcome any danger of leakage in the gland joint to reduce the fluid pressure in the manual device I may employ a construction illustrated in Fig. 14.

In this construction the piston 28× corresponding to the piston 28 of Fig. 4 is provided with a rod 43 rotatably mounted in the stud 2× and keyed to the hub structure so that it slides but does not turn. 44 is a cylindrical chamber extending from the hub base and to which the pressure pipe 29× extends. 45 is a piston operating in the cylinder 44 and provided with a rod 46 keyed to the stud 2× so as to slide but not turn. 47 is a thrust bearing interposed between the opposing ends of the rods 43 and 46. By this means the fluid pressure is transmitted through the piston 45, rod 46, thrust bearing 47, rod 43 and piston 28× to the fluid in the distributing chamber 5×.

In Figs. 5, 6 and 7 I show a limiting stop for the vertical hinge consisting of a projection 48 extending from the link 25 into the hollow shaft 24 to bear against the opposite side walls thereof when in its limiting position.

In Figs. 8, 9 and 10 I show the limiting projection provided with compression springs 49 to resist movement in one way.

The above construction illustrated in Figs. 5 to 10 provide the largest possible bearing surface for a hinge of given movement in which the arms are of a given size with the least possible added weight.

From the above description referring to Figures 1 to 11 it will be seen that the lifting force on the wing in its normal position applies no twist or movement on the wing axle 13 or to the arm 14 the only pressure applied to the fluid in the cylinder being that of the spring 12. When the wing drops behind its normal position as at 23 in advancing into the wind from 22 to 23, a twisting movement is applied to the shaft 13 by reason of the lift line being back of the axis of this shaft swinging the arm 14 putting pressure on the piston 11 of that unit, forcing some of the fluid from the corresponding cylinder 8 into the other cylinders 8.

In the following wind, as shown by the wing position 21, the pressure on the piston 11 is relieved as the wing is ahead of its normal position putting a reverse twist on the shaft 13, the spring 12 being compressed by the twisting action.

In the construction of Figs. 12 and 13 the action corresponding to the action illustrated in Fig. 1 with the exception that by reason of the lift line being to the rear of the line of centrifugal force a continuous pressure is exerted by the wings on the piston which varies as the wing advances or retires in the wind.

By the device above described automatic feathering, balancing and equalizing of the lift of the wings is obtained, together with a maximum wing lift under varying conditions and also a braking effect on vertical descent is produced when the wings are autorotative by increasing the angle of incidence at the will of the operator immediately before landing and a variable lift control when the wings are positively driven by varying the angle of incidence at the will of the operator.

What I claim as my invention is:

1. In an aircraft, a rotor having a plurality of wings mounted to rotate in a horizontal plane and comprising a central hub turnably mounted on the craft, wing carrying rock shafts mounted in the hub, wings carried on the shafts, mechanism operated by fluid pressure exerted by wind pressure on the position of each wing in relation to centrifugal force to change the angle of incidence in each wing opposing a head wind and produce an angle of incidence in each wing retreating from the following wind.

2. In an aircraft, a winged rotor mounted to rotate in a horizontal plane and comprising a central hub turnably mounted on the craft, wing carrying rock shafts mounted in the hub, wings carried on the shaft, mechanism operated by fluid pressure exerted by increased lift pressure on each wing opposing a head wind to reduce their angle of incidence and produce an angle of incidence in each wing retreating from the following wind, and means operable at the will of the operator for varying the angle of incidence simultaneously of all the wings of the rotor.

3. In an aircraft, a winged rotor mounted to rotate in a horizontal plane and comprising a central hub turnably mounted on the air craft, wing carrying rock shafts journalled in the hub, wings carried thereby, a cylinder on the hub corresponding to each wing, a fluid filled distributing chamber, a fluid filled distributing duct extending between each cylinder and the distributing chamber, a resiliently held piston forming a fluid filled space between the piston and cylinder head, and a connection between each piston and a corresponding rock shaft whereby the shaft is rocked by the movement of the piston and vice versa.

4. In an aircraft, a winged rotor mounted to rotate in a horizontal plane and comprising a central hub turnably mounted on the aircraft, wing carrying rock shafts journalled in the hub, wings carried thereby, a cylinder on the hub corresponding to each wing, a fluid filled distributing chamber, a fluid filled distributing duct extending between each cylinder and the distributing chamber, a resiliently held piston forming a fluid filled space between the piston and cylinder head, a connection between each piston and a corresponding rock shaft whereby the shaft is rocked by the movement of the piston and vice versa, and means for exerting additional pressure at the will of the operator on the fluid in distributing chamber.

5. In an aircraft, a winged rotor mounted to rotate in a horizontal plane and comprising a central hub turnably mounted on the aircraft, wing carrying rock shafts journalled in the hub, wings carried thereby, a cylinder on the hub corresponding to each wing, a fluid filled distributing chamber, a fluid filled distributing duct extending between each cylinder and the distributing chamber, a resiliently held piston forming a fluid filled space between the piston and cylinder head, a connection between each piston and a corresponding rock shaft whereby the shaft is rocked by the movement of the piston and vice versa, a fluid duct entering the distributing chamber at one end, and means at the opposite end for varying the fluid pressure through the duct to the distributing chamber.

6. In an aircraft, a winged rotor mounted to rotate in a horizontal plane and comprising a central hub turnably mounted on the aircraft, wing carrying rock shafts journalled in the hub, wings carried thereby, a cylinder on the hub corresponding to each wing, a fluid filled distributing chamber, a fluid filled distributing duct extending between each cylinder and the distributing chamber, a resiliently held piston forming a fluid filled space between the piston and cylinder head, a connection between each piston and a corresponding rock shaft whereby the shaft is rocked by the movement of the piston and vice versa, a fluid duct entering the distributing chamber at one end and means at the opposite end for varying the fluid pressure through the duct to the distributing chamber, and a free piston operating in the distributing chamber and dividing the upper from the lower portion of the distributing chamber.

7. In a device of the class described, the combination with the rotor hub and carrying stud, of a fluid distributing chamber having distributing ducts leading from the upper portion thereof, a lower fluid receiving chamber, a tubular bearing extending between said chambers, a free piston in each chamber, a rod connected to each piston and fitting the tubular bearing and keyed respectively to the hub and stud, a thrust bearing between the opposing ends of the rods, and means at the will of the operator for varying the pressure beneath the piston of the lower chamber.

8. In an aircraft, a horizontal rotor comprising a central hub, rockable shafts radiating therefrom, wings, a universal joint connection between each wing and a corresponding rock shaft, and means operated by fluid pressure exerted by the wing entering the wind for producing an angle of incidence of the wings retreating from the following wind.

9. In a horizontal rotor for aircraft, the combination with the hub, of a rock shaft mounted in the hub, a wing, a universal joint connection between the wing and rock shaft comprising a link connected respectively to the rock shaft and wing by vertical and horizontal hinge pins, and a tapering projection extending from the end of the link into a tubular portion of the wing.

10. In an aircraft rotor, a rotor hub, wings turnably and independently mounted in the hub, means operated by fluid pressure for controlling the angle of incidence of the wings, and means for distributing such pressure to maintain a constant average lift of the rotor wings.

11. In an aircraft rotor, a rotor hub, wings turnably and independently mounted in the hub, means operated by fluid pressure for controlling the angle of incidence of the wing, means for distributing such pressure to maintain a constant average lift of the rotor wings, and means for varying the average lift maintained.

12. In an aircraft rotor, a rotor hub, wings turnably and independently mounted in the hub, means operated by fluid pressure for controlling the angle of incidence of the wings, means for distributing such pressure to maintain a constant average lift of the wings, and manually operated means for varying the average lift maintained.

GERALD DREW SMITH.